United States Patent
Kisilev et al.

(10) Patent No.: US 8,903,126 B2
(45) Date of Patent: Dec. 2, 2014

(54) DETERMINING PARAMETER VALUES BASED ON INDICATIONS OF PREFERENCE

(75) Inventors: Pavel Kisilev, Maalot (IL); Daniel Freedman, Ya'aqov (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 782 days.

(21) Appl. No.: 13/118,699

(22) Filed: May 31, 2011

(65) Prior Publication Data

US 2012/0308157 A1 Dec. 6, 2012

(51) Int. Cl.
*G06K 9/00* (2006.01)
*G06F 17/11* (2006.01)
*G06K 9/36* (2006.01)
*G06Q 10/00* (2012.01)

(52) U.S. Cl.
CPC *G06K 9/36* (2013.01); *G06F 17/11* (2013.01); *G06Q 10/00* (2013.01)
USPC .......................................... 382/103; 382/155

(58) Field of Classification Search
None
See application file for complete search history.

(56) References Cited

U.S. PATENT DOCUMENTS

| 2004/0133526 | A1 | 7/2004 | Shmueli |
| 2009/0265290 | A1 | 10/2009 | Ciaramita |
| 2009/0290802 | A1* | 11/2009 | Hua et al. ..................... 382/225 |

OTHER PUBLICATIONS

Automatic parameter selectrion . . . error, Kohavi et al., Machine learning proceedings, 1995, pp. 304-312.*
Adaptive constrained—Case, Slavakis et al., IEEE, 1053-587X, 2009, pp. 4744-4763.*
Alberto Broggi, Massimo Bertozzi, and Alessandra Fascioli, Self-Calibration of a Stereo Vision System for Automotive Applications, 2001 (6 pages).
Vladimir Cherkassky and Yunqian Ma, Practical Selection of SVM Parameters and Noise Estimation for SVM Regression, 2004 (22 pages).
Kimeldorf, Some Results on Tchebycheffian Spline Functions, Journal of Mathematical Analysis and Applications, vol. 33, No. 1, Jan. 1971 (14 pages).
Kohavi et al., Machine Learning: Proceedings of the Twelfth International Conference, pp. 304-312, San Francisco, 1995—Automatic Parameter Selection by Minimizing Estimated Error.
Lindeberg, Technical Report ISRN KTH/NA/P-96-SE, May 1996, Feature Detection with Automatic Scale Selection (53 pages).
Marks et al., Design Galleries: A General Approach to Setting Parameters for Computer Graphics and Animation, 1997 (12 pages).
Scholkopf and Smola: Learning with Kernals, Mar. 2, 2001 (38 pages).
Scholkopf et al., A Generalized Representer Theorem, 2001 (11 pages).
Tomasi et al., Bilateral Filtering and Gray and Color Images, 1998 (8 pages).

(Continued)

*Primary Examiner* — Jayesh A Patel

(57) ABSTRACT

Indications are received regarding which of plural outputs are preferred over others of the plural outputs. A continuous function is computed that satisfies constraints corresponding to the received indications and that satisfies a predefined criterion. Values of parameters are computed based on the continuous function, wherein the values of the parameters are useable in a process to generate an output.

19 Claims, 3 Drawing Sheets

(56) References Cited

OTHER PUBLICATIONS

Wang et al., IEEE Transactions on Image Processing, vol. 13, No. 4, Apr. 2004—Image Quality Assessment: From Error Visibility to Structural Similarity (14 pages).

Yitzhaky et al., IEEE Transactions on Pattern Analysis and Machine Intelligence, vol. 25, No. 10, Oct. 2003—A Method for Objective Edge Detection Evaluation and Detector Parameter Selection (7 pages).

Klaus Brinker, Active Learning of Label Ranking Functions, 2004 (8 pages).

Wei Chu, Preference Learning with Gaussian Processes, 2005 (8 pages).

Har-Peled et al., Constraint Classification for Multiclass Classification and Ranking, 2003 (8 pages).

Parakhin, 2009 10th International Conference on Document Analysis and Recognition, Finding the Most Probable Ranking of Objects with Probabilistic Pairwise Preferences, IEEE 2009 (5 pages).

Kisilev et al., Parameters by Pairwise Choices—Parameter Tuning by Pairwise Preferences, Aug. 2010 (11 pages).

Verberne et al., Learning to Rank QA Data—Evaluating Machine Learning Techniques for Ranking Answers to Why-Questions, 2009 (8 pages).

Pedersen et al., Modeling Player Experience for Content Creation, Mar. 2010 (14 pages).

Har-Peled et al., Constraint Classification: A New Approach to Multiclass Classification and Ranking, Jul. 8, 2002 (11 pages).

J. Duchon. Splines minimizing rotation-invariant semi-norms in Sobolev spaces, Constructive theory of functions of several variables, pp. 85-100, 1977.

R. Herbrich, T. Graepel, and K. Obermayer. Large margin rank boundaries for ordinal regression. In Advances in Large Margin Classifiers. MIT Press, pp. 115-132, 2000.

\* cited by examiner

DETERMINING PARAMETER VALUES BASED ON INDICATIONS OF PREFERENCE

BACKGROUND

A process often has a set of parameters that control or otherwise affect how the process processes input data to derive output data. An example process includes an image or video processing algorithm that can process an input (e.g. an input image, an input video) and produces an output (e.g. an output image, an output video). The values of the parameters used in the process can affect the quality (or other characteristic) of the output data.

BRIEF DESCRIPTION OF THE DRAWINGS

Some embodiments are described with respect to the following figures.

DETAILED DESCRIPTION

Tuning of parameter values to use in processes can be time-consuming and complex. Given an input, a process can produce an output—a characteristic of the output is affected by the parameter values that are used in the process. It is often desirable to tune the parameter values to allow the process to produce an output that has some target characteristic (e.g. enhanced quality from a user's view, enhanced accuracy according to some objective measure, etc.).

In accordance with some implementations, a semi-automatic approach to parameter tuning is provided, where this approach is general purpose and can be used for a wide variety of processes, including image and video processing (for producing a processed image or video), or other types of processing (e.g. processing to estimate a vehicle velocity, processing to estimate a position of an entity, etc.). A process generally has the following two inputs: (1) input data (e.g. an input image or video, or another type of input data) and (2) parameter values that are to be applied by a process to be performed on the input data. Based on the input data and the parameter values, the process produces an output (which can be an image or video, or some other output data).

Although reference is made to parameter tuning in the context of image or video processing, it is noted that techniques or mechanisms according to some implementations can be applied in other contexts to other types of processes.

In the image or video processing context, parameter values can be tuned for processes such as image or video denoising (to remove noise from an image or video), image or video filtering, image or video segmentation, edge detecting in an image or video, or other processes. Note that the foregoing list of processes is provided for purpose of example—there can be numerous other example processes.

Figure 1:
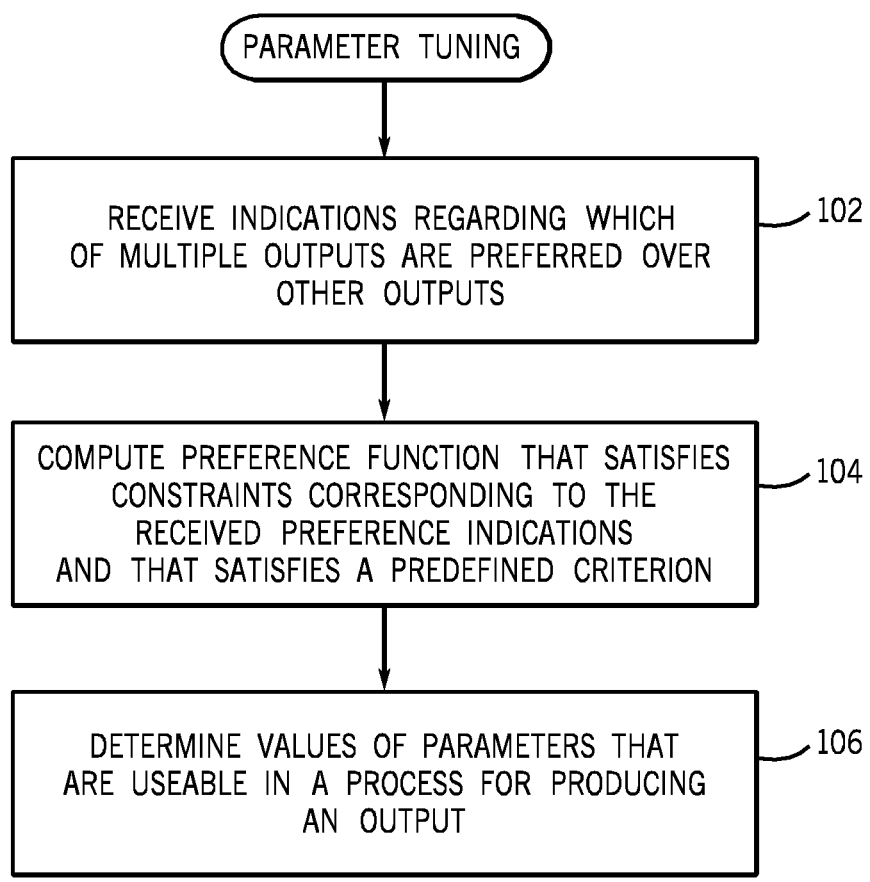
FIG. 1 is a flow diagram of a procedure for tuning parameters according to some implementations.

FIG. 1 is a flow diagram of a procedure according to some implementations for tuning parameter values of a process. The procedure receives (at 102) indications regarding which of multiple outputs are preferred over others of the multiple outputs. The indications can be indications responsive to user selection—based on the outputs presented to a user (or users), the user(s) can select which outputs are preferred over other outputs. As discussed in further detail below, the outputs can be presented as pairs of outputs to the user(s), with the user(s) prompted to select which output of each pair is preferred by the user(s).

The multiple outputs are generated by a process for corresponding different sets of parameter values. For each given set of parameter values, a run of the process is executed to produce the respective output. Multiple runs of the process are performed for different sets of parameter values.

In some implementations, each run of a process can be characterized by a triple (input, parameter, output), where input represents the input data to the process, output represents the output data produced by the process, and parameter represents a set of parameters whose values are to be tuned using techniques or mechanisms according to some implementations. The tuning of the values of the parameters in parameter affects the output produced by the respective process.

The process is run several times, leading to several triples of the form $\{(\text{input}_i, \text{parameter}_i, \text{output}_i)\}_{i=1}^m$, where m>1 represents the number of runs. From these runs, the user is given pairs of outputs, and asked to judge which output is preferred (e.g. which output has a higher quality output from the user's point of view). For example, one such pair may be ($\text{output}_1$, $\text{output}_2$), and the user may decide that $\text{output}_1$ is preferred over $\text{output}_2$. This implies that the set $\text{parameter}_1$ (used by the process to produce $\text{output}_1$) is preferable to the set $\text{parameter}_2$ (used by the process to produce $\text{output}_2$). Such preference is denoted as:

$$\text{parameter}_1 \succ \text{parameter}_2$$

The user provides pairwise preferences for multiple pairs of outputs, which are received as the indications at 102 in FIG. 1 in some implementations. Based on the received indications of preferences (e.g. pairwise preferences), the goal is to find a preference function over the parameter space which respects the user's preferences, such that if $\text{parameter}_1 \succ \text{parameter}_2$ then the preference function is larger for $\text{parameter}_1$ than for $\text{parameter}_2$.

The pairwise ranking approach discussed above is attractive since it places minimal (or reduced) demands on the user—at any given time, the user is only asked to judge between two outputs, and to indicate which of the outputs is better. This is generally much easier than having the user supply a full ranking on a large number of outputs, which for many applications can be challenging. In other implementations, note that other techniques of user ranking can be employed rather than pairwise ranking—for example, a user may be asked to rank among k (k>2) outputs within each set, where the ranking is received as indications (at 102 in FIG. 1).

In the ensuing discussion, reference is made to pairwise preference rankings by the user—in alternative examples, other types of preference rankings can be used.

The procedure of FIG. 1 computes (at 104) a preference function that satisfies constraints corresponding to the received indications (e.g. pairwise preference rankings from the user) and that satisfies a predefined criterion (e.g. a smoothness criterion as discussed in further detail below). The preference function that is computed is a continuous function, which provides continuous values within a given parameter space (space of possible values of parameters that are to be tuned). A continuous function is distinguished from a function represented by a discrete set of elements.

Given a user's pairwise preference rankings, in some implementations, the problem can be formulated as one of finding the smoothest function which satisfies the user's preference constraints (where the preference constraints are derived from the pairwise preference rankings). A smoothness energy can often be specified as a norm in a Reproducing Kernel Hilbert Space, leading to the reduction of the problem at hand to a finite-dimensional convex optimization (details regarding this are discussed further below). Once the preference function has been computed (104 in FIG. 1), the procedure of FIG. 1 determines (at 106) values of the parameters that are useable in the process for producing an output having a target characteristic (e.g. output of high quality from a user's viewpoint, a most accurate output according to some objective measure, etc.). In some implementations, the parameter values determined (at 106) are optimal parameter values that maximize the preference function (computed at 104).

As noted above, given multiple (m) runs of a process, multiple (m) triples $\{(input_i, parameter_i, output_i)\}_{i=1}^{m}$ are derived. A user provides pairwise preference rankings for several (n, n>1) pairs of outputs. Based on these pairwise preferences, the goal is to find a preference function over the parameter space which respects the user's preferences, such that if $parameter_1 \succ parameter_2$ then the preference function is larger for $parameter_1$ than for $parameter_2$. There can be many possible preference functions that satisfy the foregoing—the challenge is to determine which of the many possible preference functions to select.

In some implementations, the criterion used to select from among the possible preference functions is a smoothness criterion, such that a smoothest preference function is selected. The problem of choosing the smoothest function subject to the user's pairwise preference rankings is formalized as follows. Let the parameters (of the process) be denoted by the vector x, and the parameter space by $X=R^d$ (in other words, the parameter values can take on values in the parameter space X). Let the user preference function be denoted by f: X→R, where the arrow→indicates a mapping between the parameter space (X) and the space of rational numbers (R). The set of possible preference functions (f) is denoted F. Let S[f] denote the "smoothness energy functional" of the preference function f—if f is very smooth, S[f] will be small, and if f is not smooth (e.g. f has many variations or wiggles in the function), then S[f] will be large. It is assumed that the smoothness energy functional S[f] is non-negative, S: F→$R_+$.

Parameter pairs are denoted by $\{(x_{2i-1}, x_{2i})\}_{i=1}^{n}$ (there are n pairs), where the parameter pairs have been ordered so that $x_{2i-1}$ is preferred to $x_{2i}$. One may think that this preference constraint could be written as $f(x_{2i-1}) > f(x_{2i})$; however, with such a constraint, one may take $f(x_{2i-1})$ arbitrarily close to $f(x_{2i})$, with the resulting smoothest function being essentially constant. Thus, in some implementations, the constraints are written as $$f(x_{2i-1}) \geq f(x_{2i})+1, \quad \text{(Eq. 1)}$$

where the 1 above is arbitrary, and may be replaced by any other constant.

The optimization problem to be solved can be expressed as:

$$\min_{f \in F} S[f] \text{ subject to } f(x_{2i-1}) \geq f(x_{2i}) + 1, i = 1, \ldots, n. \quad \text{(Eq. 2)}$$

In Eq. 2, the value of n represents the number of pairs of outputs that have been presented to a user for pairwise preference ranking The optimization problem is to minimize the smoothness energy functional S[f] subject to constraints according to the user preference indications. Eq. 2 represents an infinite-dimensional optimization over a continuous function f. In some implementations, the problem expressed by Eq. 2 is reduced to a more manageable convex, finite-dimensional optimization problem.

In some examples, a Reproducing Kernel Hilbert Space (RKHS), and the norm within the RKHS, are defined. A goal according to some implementations is to express the smoothness energy functional S[f] as a norm within an RKHS. The reason for doing so is to provide the ability to convert the infinite-dimensional optimization problem of Eq. 2 into a simpler, finite-dimensional optimization, as discussed further below.

The following explains how various classes of smoothness energy functionals may be captured as norms within given RKHS's. Given a set X (which represents the parameter space), a kernel k on X is defined as a function k: $X^2 \to R$ such that for all finite subsets $\{x_i\}_{i=1}^{n}$ of X, a matrix K with elements given by $K_{ij}=k(x_i,x_j)$ is positive definite. Intuitively, the kernel k measures the similarity between objects in the set X. A Reproducing Kernel Hilbert Space (RKHS) may then be defined as follows.

Let X be a nonempty set and H a Hilbert space of functions f: X→R. Then H is called a Reproducing Kernel Hilbert Space endowed with the dot product $\langle \cdot, \cdot \rangle$ if there exists a function k: $X^2 \to R$ with the following properties:

(1) k has the reproducing property $\langle f, k(x,\cdot) \rangle = f(x)$ for all f ∈ H.

(2) k spans H, i.e.

$$H = \overline{\text{span}\{k(x, \bullet) : x \in X\}},$$

where $\overline{Z}$ denotes the completion of the set Z.

Given an RKHS H, the inner product defines a norm in the standard way:

$$\|f\|_\mathcal{H} \equiv \sqrt{\langle f, f \rangle}. \quad \text{(Eq. 3).}$$

The following discusses how the smoothness energy functional S[f] can be expressed as a norm in an RKHS. Several examples are set forth below. A standard smoothness energy functional S[f] penalizes the second derivative of the function:

$$S[f] = \sum_{k,l=1}^{d} \left( \frac{\partial^2 f}{\partial x_k \partial x_l} \right)^2. \quad \text{(Eq. 4)}$$

This functional is sometimes called the thin-plate spline functional. It turns out that this functional S[f] may be expressed as the square of the norm $\|f\|_\mathcal{H}^2$ in an RKHS H with kernel k given by $$k(x, x') = \begin{cases} \|x-x'\|^d & \text{if } d \text{ is even} \\ \|x-x'\|^d \log\|x-x'\| & \text{if } d \text{ is odd}. \end{cases} \quad \text{(Eq. 5)}$$

Alternatively, another smoothness energy functional may be expressed more easily in the Fourier domain Let $$S[f] = \int \frac{\|\tilde{f}(\omega)\|^2}{\tilde{G}(\omega)} d\omega, \qquad \text{(Eq. 6)}$$

where $\tilde{f}$ denotes the Fourier transform of f. The function $\tilde{G}(\omega)$ should be small when $\omega$ (frequency) is large; this will effectively penalize high-frequency oscillations in f(x). This smoothness energy functional S[f] may be expressed as the square of the norm $\|f\|_H^2$ in an RKHS H with kernel k given by k(x, x')=G(x−x'), where G is the inverse Fourier transform of $\tilde{G}$. For example, $\tilde{G}(\omega) = |\sigma| e^{-\sigma^2 \|\omega\|^2/2}$ can be chosen, in which case K (x,x')=$e^{-\|x-x'\|^2/\sigma^2}$, the familiar Gaussian kernel.

The foregoing has shown that the smoothness energy functional S[f] can be expressed as the norm (or squared norm) in an RKHS. In this case, the optimization problem of Eq. 2 can be rewritten as:

$$\min_{f \in \mathcal{H}} \|f\|_{\mathcal{H}} \text{ subject to } f(x_{2i-1}) \geq f(x_{2i}) + 1, i = 1, \ldots, n. \qquad \text{(Eq. 7)}$$

The constraints can be rewritten as follows.

$$C(f(x_1), \ldots, f(x_{2n})) = \qquad \text{(Eq. 8)}$$
$$\begin{cases} 0 & \text{if } f(x_{2i-1}) \geq f(x_{2i}) + 1 \text{ for } i = 1, \ldots n \\ \infty & \text{otherwise.} \end{cases}$$

Then the optimization problem can be rewritten as $$\min_{f \in \mathcal{H}} C(f(x_1), \ldots, f(x_{2n})) + \|f\|_{\mathcal{H}}. \qquad \text{(Eq. 9)}$$

To solve the problem of Eq. 9, the Representer Theorem can be used. Generally, the Representer Theorem reduces an infinite dimensional problem of finding a function in an RKHS to an n-dimensional problem.

Let $\Theta: R_+ \to R$ be a strictly monotonically increasing function, and let $C: R^{2n} \to R \cup \{\infty\}$ be an arbitrary function. Then any minimizer of the problem $$\min_{f \in \mathcal{H}} C(f(x_1), \ldots, f(x_{2n})) + \Theta(\|f\|_{\mathcal{H}}), \qquad \text{(Eq. 10)}$$

admits a representation of the form $$f(x) = \sum_{i=1}^{2n} \alpha_i k(x, x_i). \qquad \text{(Eq. 11)}$$

In Eq. 11 above, the scalars $\{\alpha_i\}_{i=1}^{2n}$ are unknown, and are to be solved as discussed further below. Once the scalars $\{\alpha_i\}_{i=1}^{2n}$ are computed, the preference function f(x) can be readily derived using Eq. 11. The Representer Theorem thus reduces the infinite-dimensional optimization problem (Eq. 2) where one has to search over an entire space of functions, to a finite dimensional optimization in which one can simply find the best 2n scalars $\{\alpha_i\}_{i=1}^{2n}$. The following shows how to perform this reduction explicitly.

According to the Representer Theorem, the optimal solution for f can be written as $f(x) = \sum_{i=1}^{2n} \alpha_i k(x, x_i)$ (Eq. 11 above). In this case, the squared norm of f in the RKHS may be simplified as follows:

$$\|f\|_{\mathcal{H}}^2 = \langle f, f \rangle \qquad \text{(Eq. 12)}$$
$$= \left\langle \sum_{i=1}^{2n} \alpha_i k(\cdot, x_i), \sum_{j=1}^{2n} \alpha_j k(\cdot, x_j) \right\rangle$$
$$= \sum_{i=1}^{2n} \sum_{j=1}^{2n} \alpha_i \alpha_j \langle k(\cdot, x_i), k(\cdot, x_j) \rangle$$
$$= \sum_{i=1}^{2n} \sum_{j=1}^{2n} \alpha_i \alpha_j k(x_i, x_j)$$
$$= \alpha^T K \alpha,$$

where in the fourth line of Eq. 12, the reproducing property of the kernel k has been used, and in the final line of Eq. 12, K is defined as a 2n×2n matrix, and a as a 2n×1 column vector. The constraint $f(x_{2i-1}) \geq f(x_{2i})+1$ may be rewritten as $$\sum_{j=1}^{2n} \alpha_i k(x_{2i-1}, x_j) - \sum_{j=1}^{2n} \alpha_i k(x_{2i}, x_j) \geq 1. \qquad \text{(Eq. 13)}$$

The matrix K is divided into two submatrices: $K_{odd}$ and $K_{even}$. $K_{odd}$ denotes the n×2n submatrix of K with the odd rows selected, and $K_{even}$ denotes the submatrix with the even rows selected. Then the set of n constraints in Eq. 13 can be rewritten as as $$B\alpha \geq e,$$

where $B = K_{odd} - K_{even}$ and e is the n-dimensional vectors whose entries are all 1's.

Thus, the optimization problem in Eq. 7 is reduced to $$\min_{\alpha \in R^{2n}} \alpha^T K \alpha \text{ subject to } B\alpha \geq e, \qquad \text{(Eq. 14)}$$

which is a quadratic program, and can be solved by any standard solver.

The quadratic program of Eq. 14 is solved to obtain the optimal set of scalars $\{\alpha_i^*\}_{i=1}^{2n}$. As noted above, n represents the number of pairs of outputs that have been presented to a user for pairwise preference ranking. The scalars solved using Eq. 14 can then be plugged into Eq. 11 to find the smoothest preference function f*(x) satisfying the user constraints (based on the pairwise preference rankings discussed above). Given this preference function f*(x), the optimal parameters can be computed by maximizing f*, as follows:

$$x^* = \operatorname*{argmax}_{x \in X} f^*(x). \qquad \text{(Eq. 15)}$$

The optimization of Eq. 15 can be performed exhaustively if the dimension of X is sufficiently small, e.g. 2 or 3. Alternatively, if the dimension of the parameter space is relatively high, then the optimal parameter values may be estimated by the best of the parameter values that have been used for learning:

$$\tilde{x} = \underset{x \in \{x_i\}_{i=1}^{2n}}{\operatorname{argmax}} f^*(x). \tag{Eq. 16}$$

Figure 2:
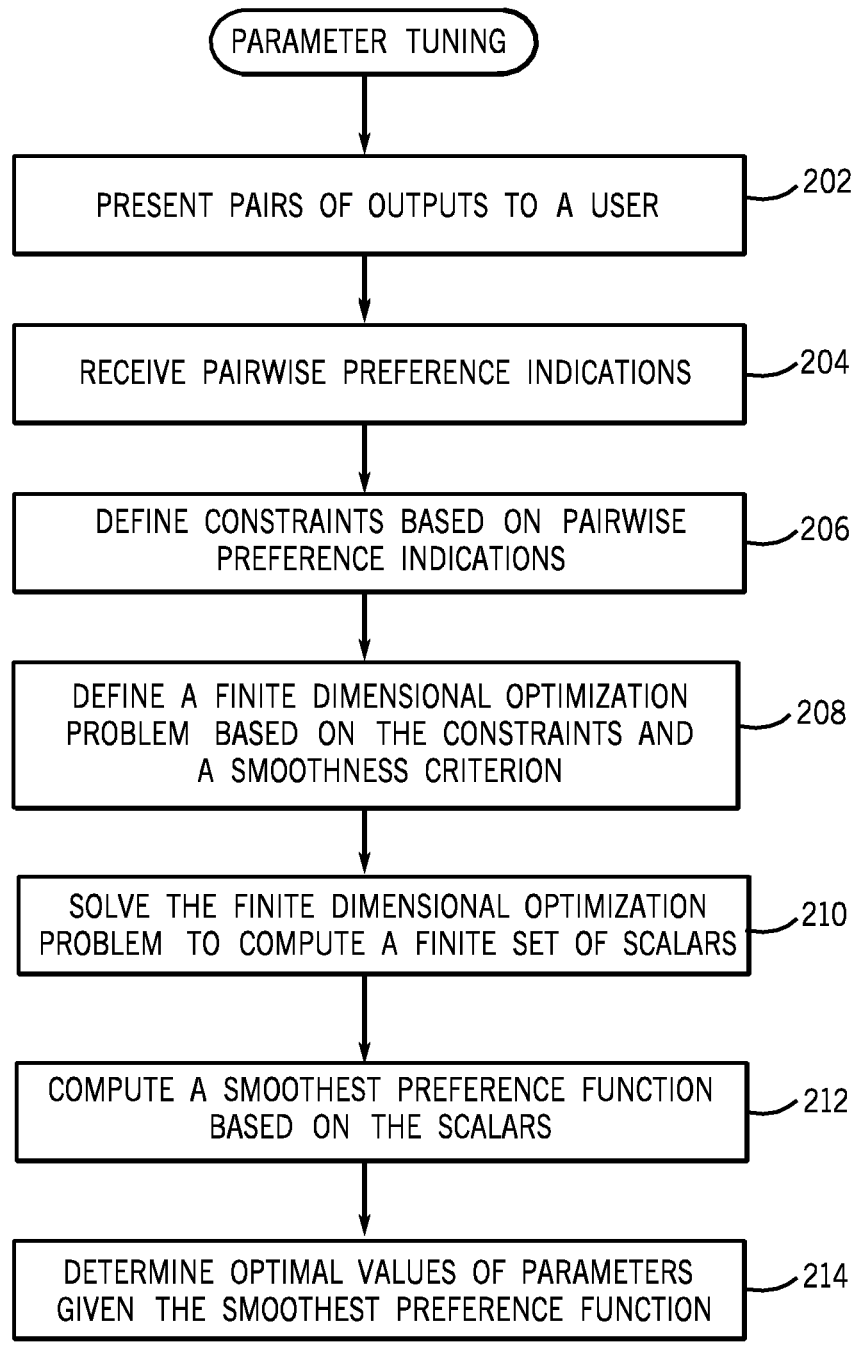
FIG. 2 is a flow diagram of a procedure for tuning parameters according to alternative implementations.

FIG. 2 is a flow diagram of a procedure of parameter tuning for a process, according to further implementations. The procedure of FIG. 2 presents (at 202) pairs of outputs to a user (or multiple users). As discussed above, the outputs have been generated using multiple runs of the process. The procedure receives (at 204) pairwise preference indications based on user selection of preferred outputs within respective pairs.

The procedure then defines (at 206) constraints based on the pairwise preference indications, such as the constraints expressed in Eq. 7. A finite dimensional optimization problem is defined (at 208), such as the optimization problem expressed in Eq. 7, where this finite dimensional optimization problem is based on the constraints and a smoothness criterion.

The finite dimensional optimization problem is solved (at 210) using Eq. 14, which computes a finite set of scalars. The procedure then computes (at 212) a smoothest preference function based on the scalars, using Eq. 11. Next, optimal values of the parameters of the process are determined (at 214), using either Eq. 15 or 16.

Figure 3:
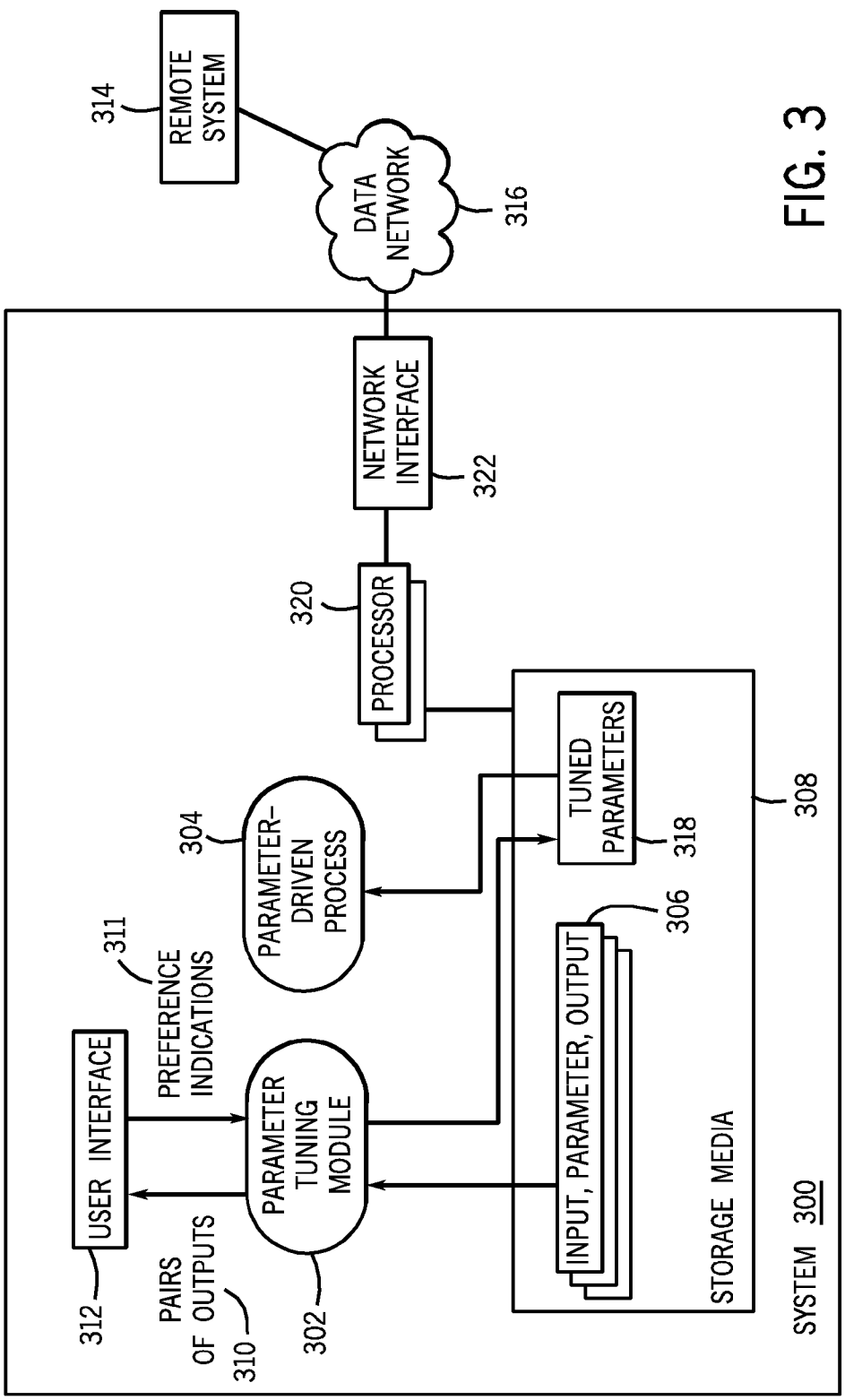
FIG. 3 is a block diagram of an example arrangement that incorporates some implementations.

FIG. 3 is a block diagram of an example arrangement that includes a system 300. The system 300 includes a parameter tuning module 302, which is able to perform the tasks of FIG. 1 or 2 discussed above. Additionally, the system 300 includes a parameter-driven process 304—this process 304 is the process for which parameter tuning is being performed. Note that in alternative examples, the parameter-driven process 304 can be located on a system separate from the system 300.

Multiple runs of the process 304 using different sets of parameter values produce respective multiple triples 306 (input, parameter, output), which can be stored in storage media 308. The triples 306 are provided as inputs to the parameter tuning module 302. The parameter tuning module 302 presents pairs of outputs (310) to a user interface 312 of the system 300. The user interface 312 can include a display screen to display the pairs of outputs to the user (or users). User pairwise preference indications (311) (based on user selection of which output in each pair 310 is preferred) are received from the user interface 312 at the parameter tuning module 302.

In alternative examples, note that the pairs of outputs (310) can be presented to a remote system (e.g. 314) coupled over a data network 316 to the system 300. In such examples, the pairwise preference indications (311) are received from the remote system 314.

Based on the preference indications (311), the parameter tuning module 302 computes tuned parameter values (318) using techniques discussed above. The tuned parameter values (318) can be stored in the storage media 308. The tuned parameter values are then input to the parameter-driven process 304 for use in generating outputs (based on input data) that has some target characteristic. In examples where the parameter-driven process 304 is located remotely, such as in remote system 314, the tuned parameter values (318) are communicated from the system 300 to the remote system 314.

The system 300 further includes one or multiple processors 320 and a network interface 322 to allow the system 300 to communicate over the data network 316.

Machine-readable instructions of the parameter tuning module 302 and the parameter-driven process 304 are executed on the processor(s) 320. A processor can include a microprocessor, microcontroller, processor module or subsystem, programmable integrated circuit, programmable gate array, or another control or computing device.

The storage media 308 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
presenting, by a system including a processor, plural outputs of a process to at least one user, the plural outputs produced by the process for corresponding different sets of values of parameters;
receiving, by the system, indications of user selections regarding which of the presented plural outputs are preferred over others of the presented plural outputs;
computing, by the system, a continuous function that satisfies constraints corresponding to the received indications and that satisfies a predefined criterion; and
determining, by the system, values of the parameters based on the continuous function, wherein the determined values of the parameters are useable in the process to generate an output.

2. The method of claim 1, wherein determining the values of the parameters comprises determining the values of the parameters that cause the generated output to attain a target characteristic.

3. The method of claim 1, wherein presenting the plural outputs comprises presenting pairs of the plural outputs to the at least one user,
wherein receiving the indications of user selections comprises receiving the indications of user selections regarding which output within each corresponding one of the pairs is preferred over another output in the corresponding pair.

4. The method of claim 1, wherein computing the continuous function comprises computing a smoothest continuous function that satisfies the constraints.

5. The method of claim 4, further comprising providing an expression of an optimization problem for computing the continuous function, wherein a smoothness energy functional corresponding to a smoothness criterion is expressed as a norm in a Reproducing Kernel Hilbert Space to represent the optimization problem as a finite-dimensional optimization problem.

6. The method of claim 5, wherein the optimization problem seeks to minimize the smoothness energy functional.

7. The method of claim 5, further comprising solving the optimization problem as a quadratic program.

8. The method of claim 1, wherein each of the plural outputs is associated with a respective set of values of the parameters, and wherein computing the continuous function comprises computing the continuous function in a parameter space that includes the values of the parameters associated with the plural outputs.

9. An article comprising at least one non-transitory machine-readable storage medium storing instructions that upon execution cause a system to:
  present, to at least one user, plural outputs of a process, the plural outputs produced by the process for corresponding different sets of values of parameters;
  receive indications of user selections regarding which of the presented plural outputs are preferred over others of the presented plural outputs;
  define constraints using the indications;
  solve a problem for computing a continuous function according to the constraints and a smoothness criterion; and
  compute output values of the parameters based on the continuous function, where the output values of the parameters are to be applied in the process for generating an output.

10. The article of claim 9, wherein the instructions upon execution cause the system to further:
  apply the output values of the parameters in the process to generate the output having a target characteristic.

11. The article of claim 10, wherein the generated output is an output image or video.

12. The article of claim 9, wherein solving the problem comprises solving a finite-dimensional optimization problem.

13. The article of claim 12, wherein the smoothness criterion comprises a criterion to reduce a smoothness energy, and wherein expressing the smoothness energy using a norm in a Reproducing Kernel Hilbert Space allows for an expression of the finite-dimensional optimization problem.

14. The article of claim 9, wherein the instructions upon execution cause the system to further:
  run the process a plurality of times to produce the plural outputs given the corresponding different sets of values of the parameter.

15. The article of claim 14, wherein
  presenting the plural outputs comprises presenting pairs of the plural outputs to the at least one user,
  wherein receiving the indications comprises receiving user preference indications regarding which output within each of the pairs is preferred.

16. A system comprising:
  a storage medium to store plural outputs generated by a process for respective different sets of values of parameters; and
  at least one processor to:
    present the plural outputs to at least one user;
    receive indications of user selections regarding which of the presented plural outputs are preferred over others of the presented plural outputs;
    compute a continuous function that satisfies constraints corresponding to the received indications and that satisfies a predefined criterion; and
    determine values of the parameters based on the continuous function, wherein the determined values of the parameters are useable by the process to generate an output having a target characteristic.

17. The system of claim 16, wherein the plural outputs are to be presented as pairs of outputs, and wherein the received indications comprise received indications of user selections regarding which output within each corresponding one of the pairs is preferred over another output in the corresponding pair.

18. The system of claim 16, wherein the predefined criterion is a smoothness criterion, and wherein satisfying the smoothness criterion produces a smoothest continuous function that satisfies the constraints.

19. The system of claim 16, wherein the continuous function is to be computed based on solving a finite-dimensional optimization problem.

* * * * *